US012770396B2

(12) United States Patent
Agostinelli et al.

(10) Patent No.: US 12,770,396 B2
(45) Date of Patent: Oct. 20, 2026

(54) METHOD, SYSTEM AND SOFTWARE FOR ANALYSING MOVING IMAGES

(71) Applicant: LIVEARENA TECHNOLOGIES INC., Bellevue, WA (US)

(72) Inventors: Strider Agostinelli, Everett, WA (US); Anders Nilsson, Falköping (SE)

(73) Assignee: LiveArena Technologies, Inc., Bellevue, WA (US)

( * ) Notice: Subject to any disclaimer, the term of this patent is extended or adjusted under 35 U.S.C. 154(b) by 202 days.

(21) Appl. No.: 18/882,821

(22) Filed: Sep. 12, 2024

(65) Prior Publication Data

US 2026/0038262 A1 Feb. 5, 2026

(30) Foreign Application Priority Data

Aug. 2, 2024 (SE) .................................. 2430389-3

(51) Int. Cl.
*G06V 20/40* (2022.01)
*G06F 40/40* (2020.01)
(Continued)

(52) U.S. Cl.
CPC .............. *G06V 20/41* (2022.01); *G06F 40/40* (2020.01); *G06V 10/30* (2022.01); *G06V 10/32* (2022.01);
(Continued)

(58) Field of Classification Search
CPC ........ G06V 20/41; G06V 10/30; G06V 10/32; G06V 20/44; G06V 20/46; G06V 40/161;
(Continued)

(56) References Cited

U.S. PATENT DOCUMENTS 8,503,523 B2 8/2013 Williams et al.
12,008,332 B1 * 6/2024 Gardner ................. G06F 40/56
(Continued)

FOREIGN PATENT DOCUMENTS

AU 2024220200 A1 11/2024
CA 3164902 A1 7/2021
CN 117274868 A 12/2023

OTHER PUBLICATIONS

International search report and written opinion issued by ISA/SE on Sep. 3, 2025.
Office action issued by the Swedish Intellectual Property Office on Sep. 3, 2025.
(Continued)

*Primary Examiner* — Amit Chatly
(74) *Attorney, Agent, or Firm* — Noréns Patentbyrå AB

(57) ABSTRACT

A method for providing specific information regarding a moving image. The moving image is received. The moving image includes or is defined in terms of a set of consecutive image frames. A set of discrete representative image frames is selected among the set of consecutive image frames. The set of several discrete representative image frames is preprocessed to achieve a set of discrete preprocessed image frames. The set of several discrete preprocessed image frames is analyzed, using digital image and/or audio processing, to achieve metadata regarding the moving image, providing a first prompt to a first large language model (LLM), referencing the set of several discrete preprocessed image frames and the metadata. A first response is received from the first LLM. The first response is used to provide the specific information by querying, inspection or transformation of the first response.

20 Claims, 3 Drawing Sheets

(51) Int. Cl.

| | |
|---|---|
| ***G06V 10/30*** | (2022.01) |
| ***G06V 10/32*** | (2022.01) |
| ***G06V 40/16*** | (2022.01) |
| ***G06V 40/20*** | (2022.01) |

(52) U.S. Cl.
CPC .............. *G06V 20/44* (2022.01); *G06V 20/46* (2022.01); *G06V 40/161* (2022.01); *G06V 40/20* (2022.01); *G06V 2201/10* (2022.01)

(58) Field of Classification Search
CPC .... G06V 40/20; G06V 2201/10; G06V 10/82; G06V 40/174; G06F 40/40
See application file for complete search history.

(56) References Cited

U.S. PATENT DOCUMENTS

| | | | | |
|---|---|---|---|---|
| 2019/0340437 | A1 | 11/2019 | Smith, IV et al. | |
| 2021/0073526 | A1 | 3/2021 | Zeng et al. | |
| 2023/0385945 | A1 | 11/2023 | Wolf et al. | |
| 2024/0119508 | A1 | 4/2024 | Lishner et al. | |
| 2024/0193913 | A1 | 6/2024 | Saraee et al. | |
| 2024/0212812 | A1 | 6/2024 | Vidyashankar Keresanthe et al. | |
| 2024/0256592 | A1 | 8/2024 | O'Neill | |
| 2025/0339214 | A1* | 11/2025 | Jones | G06F 40/40 |
| 2025/0384784 | A1* | 12/2025 | Shen | G09B 5/065 |

OTHER PUBLICATIONS

Office action issued on Jan. 30, 2025 by the Swedish Intellectual Property Office.

* cited by examiner

METHOD, SYSTEM AND SOFTWARE FOR ANALYSING MOVING IMAGES

BACKGROUND

The various embodiments of the present invention relates to methods, systems and computer software for analyzing moving images.

In many different circumstances, it is desired to automatically extract information from an available set of moving images, such as a film sequence. For instance, there is a need to automatically interpret surveillance camera footage. Other examples include automatic recording and processing of various events: In case a lecture or theatre play is recorded using a film camera, it would be desirable to be able to directly extract information from the recording.

In particular, it would be desirable to be able to request responses to specific questions regarding such moving images.

Various techniques are in themselves known for processing moving images, including image processing and audio processing. However, such measures tend to be specialized in the sense that they perform well for certain predetermined tasks. A problem with moving images is that it is often difficult to know beforehand what to look for in such moving images. The format, in terms of lighting conditions, number of persons being present in the moving images, a used narrative, and so forth, are often unknown beforehand.

Large language models (LLMs) have been known to be able to process unstructured data. However, LLMs have also been known to provide unreliable results.

Large language models are well-known per se and will not be described in detail herein. However, what is meant herein by a "large language model" generally is or comprises a neural network-based model that has been trained on large volumes of text information for next-token-prediction, and that is configured to receive a prompt and to respond by a textual response. Such LLM can be based on the per se well-known transformers architecture, possibly including mechanisms for multi-head self-attention and/or positional encoding, which is well-known as such. Well-known examples of such LLMs include GPT (Generative Pre-trained Transformer) models. Such LLMs can generally be configured to accept, as input, information of various modalities, such as text, images and sound data. Non-text input can, for instance, be provided by a textual prompt containing a link or reference to the non-text information.

SUMMARY

Various embodiments of the present invention solve the above-described problems by utilizing LLM technology as a part of a methodology that increases reliability of the LLM response in a way making it possible to extract specific information from a moving image. In particular, the methods, systems and computer software described herein can be used to extract a response to a specific question regarding a moving image with contents that are at least partly unknown beforehand.

Hence, an embodiment of the invention relates to a method for providing specific information regarding a moving image, comprising the steps receiving the moving image, the moving image comprising or being defined in terms of a set of consecutive image frames along a moving image timeline and/or the set of consecutive image frames being extracted from the moving image along the moving image timeline;

selecting a set of discrete representative image frames, the representative image frames being selected among the set of consecutive image frames based on at least one of discrete points along the moving image timeline and an event detection algorithm;

preprocessing, using digital image processing, the set of several discrete representative image frames to achieve a set of discrete preprocessed image frames;

analyzing, using digital image and/or audio processing, the set of several discrete preprocessed image frames to achieve metadata regarding the moving image, providing a first prompt to a first large language model, the first prompt comprising or referencing the set of several discrete preprocessed image frames or a piece of processed information assembled based on the set of several discrete preprocessed image frames, the first prompt comprising or referencing the metadata, the first prompt being configured to request the first LLM to provide a description of contents of the moving image; receiving a first response from the first LLM; and using the first response to provide the specific information by querying, inspection or transformation of the first response.

In some embodiments, the method further comprises providing a second prompt to a second LLM, that can be the same as the first LLM, the second prompt comprising or referencing the first response and being configured to request the second LLM to provide the specific information using the first response;

receiving a second response from the second LLM; and using the second response as the specific information.

In some embodiments, the first prompt is configured to request the first LLM to provide the first response on a predetermined format.

In some embodiments, the method further comprises performing a text-based inspection or processing, such as searching or formatting, of the first response to identify the specific information in the first response.

In some embodiments, the set of discrete representative image frames constitute less than 10% of the number of image frames in the set of the set of consecutive image frames.

In some embodiments, the set of discrete representative image frames are selected as a subset of the set of consecutive image frames that occur at predetermined time intervals and/or at predetermine frame intervals.

In some embodiments, the preprocessing comprises one or several of a resizing of each of the set of discrete representative image frames, resulting in each of the set of discrete preprocessed image frames having the same frame pixel size, the same frame pixel size being smaller than an original frame pixel size of the moving image;

a normalization of each of the set of discrete representative image frames, resulting in each of the set of discrete preprocessed image frames having a normalized pixel intensity distribution individually and/or across the set of preprocessed image frames; and a denoising of each of the set of discrete representative image frames, resulting in each of the set of discrete preprocessed image frames being denoised.

In some embodiments, the preprocessing comprises a feature detection, resulting in that one or several features are identified in one or several of the set of consecutive image frames or in one or several of the set of representative image frames or in one or several of the set of preprocessed image frames.

In some embodiments, the preprocessing further comprises inserting visual markers into one or several of the set of processed image frames to highlight or otherwise mark the detected one or several features in each of the one or several of the set of processed image frames.

In some embodiments, the feature detection is one or several of an object detection, resulting in the detection of one or several visually present objects;

a human being detection, resulting in the detection of one or several visually present human beings; and a facial detection, resulting in the detection of one or several visually present faces.

In some embodiments, the feature detection is performed using a trained neural network.

In some embodiments, the feature detection is performed on several of the sets of consecutive image frames to detect a first frame and/or a last frame containing a detected feature.

In some embodiments, the method further comprises identifying corresponding ones of the set of representative frames or of the set of preprocessed frames that contain the detect the detected feature.

In some embodiments, the method further comprises a sub-feature detection step, performed with respect of one or several of features detected by the feature detection, resulting in one or several detected sub-features of detected features.

In some embodiments, the preprocessing further comprises describing the one or several detected sub-features using the metadata.

In some embodiments, the preprocessing further comprises inserting visual markers into one or several of the set of processed image frames to highlight or otherwise mark the detected one or several sub-features in each of the one or several of the set of processed image frames.

In some embodiments, the one or several sub-features comprise one or several facial features of one or several faces.

In some embodiments, the sub-feature detection is performed using a trained neural network.

In some embodiments, the feature detected in the feature detection step is in relation to a human being, and wherein the method further comprises one or several of detecting an emotion of the human being;

detecting an emotional transition of the human having across different ones of the set of processed image frames;

detecting an identification of the human being;

detecting a lip movement of the human being;

detecting, using digital audio processing, a speech of the human being;

detecting an action performed by the human being;

detecting an interaction between the human being and another detected human being and/or a detected object;

detecting a pose of the human being; and detecting a pose change of the human being across different ones of the set of processed image frames.

In some embodiments, the piece of processed information comprises a stitched together image comprising several of the set of processed image frames in a single, combined image.

In some embodiments, the piece of processed information comprises annotations visually describing features and/or actions detected in one or several of set of processed image frames.

In some embodiments, the first prompt comprises instructions to the first LLM to convert the set of preprocessed image frames into a textual representation thereof.

Some embodiments of the invention relate to a system for performing such a method. In particular, such a system is configured for providing specific information regarding a moving image, and configured to receive the moving image, the moving image comprising or being defined in terms of a set of consecutive image frames along a moving image timeline and/or the set of consecutive image frames being extracted from the moving image along the moving image timeline;

select a set of discrete representative image frames, the representative image frames being selected among the set of consecutive image frames based on at least one of discrete points along the moving image timeline and an event detection algorithm;

preprocess, using digital image processing, the set of several discrete representative image frames to achieve a set of discrete preprocessed image frames;

analyze, using digital image and/or audio processing, the set of several discrete preprocessed image frames to achieve metadata regarding the moving image, provide a first prompt to a first large language model, the first prompt comprising or referencing the set of several discrete preprocessed image frames or a piece of processed information assembled based on the set of several discrete preprocessed image frames, the first prompt comprising or referencing the metadata, the first prompt being configured to request the first LLM to provide a description of contents of the moving image;

receive a first response from the first LLM; and use the first response to provide the specific information by querying, inspection or transformation of the first response.

Some embodiments of the invention relate to a computer program (software) product configured to perform such a method when executing on one or several processors. In particular, the computer program product is configured for providing specific information regarding a moving image and configured to, when executing on said one or several processors, receive the moving image, the moving image comprising or being defined in terms of a set of consecutive image frames along a moving image timeline and/or the set of consecutive image frames being extracted from the moving image along the moving image timeline; select a set of discrete representative image frames, the representative image frames being selected among the set of consecutive image frames based on at least one of discrete points along the moving image timeline and an event detection algorithm;

preprocess, using digital image processing, the set of several discrete representative image frames to achieve a set of discrete preprocessed image frames;

analyze, using digital image and/or audio processing, the set of several discrete preprocessed image frames to achieve metadata regarding the moving image, provide a first prompt to a first large language model, the first prompt comprising or referencing the set of several discrete preprocessed image frames or a piece of processed information assembled based on the set of several discrete preprocessed image frames, the first prompt comprising or referencing the metadata, the first prompt being configured to request the first LLM to provide a description of contents of the moving image;

receive a first response from the first LLM; and use the first response to provide the specific information by querying, inspection or transformation of the first response.

The computer program product may be implemented by a non-transitory computer-readable medium encoding instructions that cause one or more hardware processors located in the system to perform the above-described method steps.

BRIEF DESCRIPTION OF THE DRAWINGS

In the following, exemplifying embodiments of the invention will be described with reference to the enclosed drawings, wherein.

DETAILED DESCRIPTION

Figure 1:
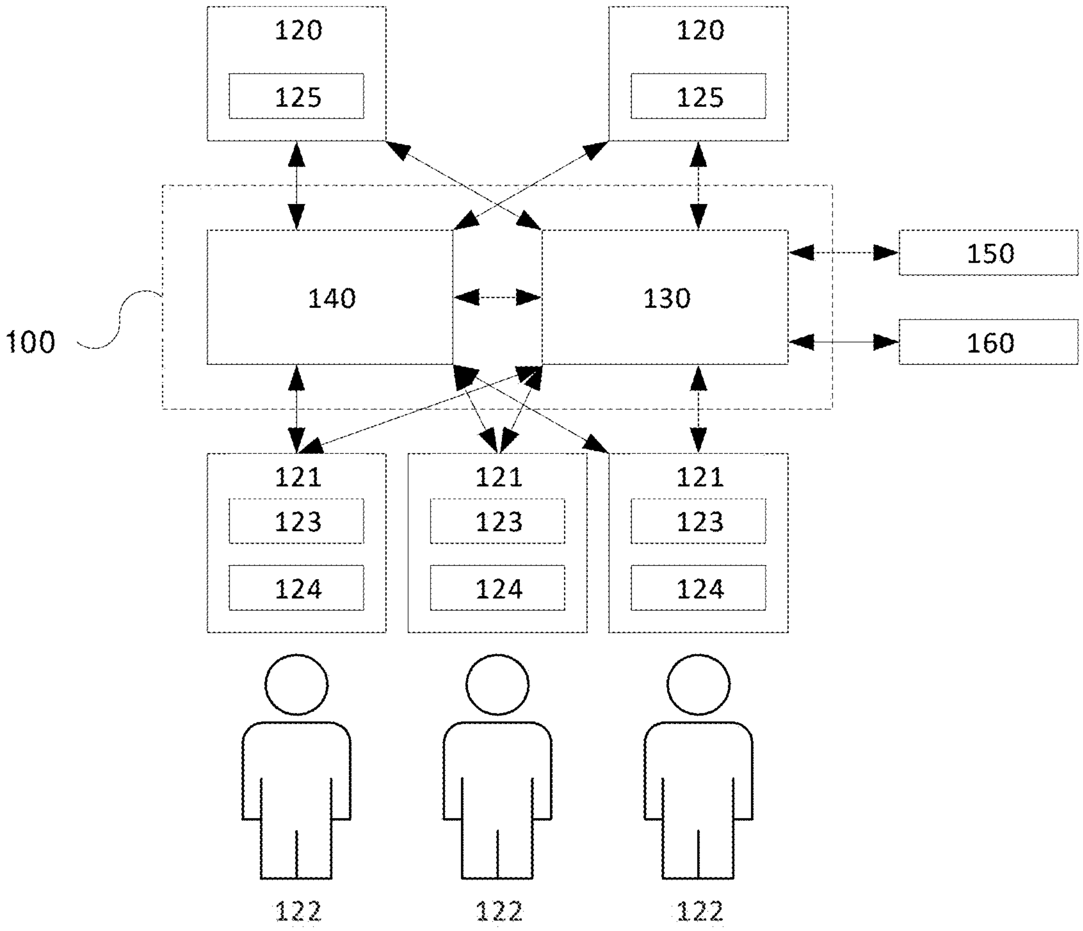
FIG. 1 illustrates a system along with various other entities, in accordance with some embodiments.
Figure 2:
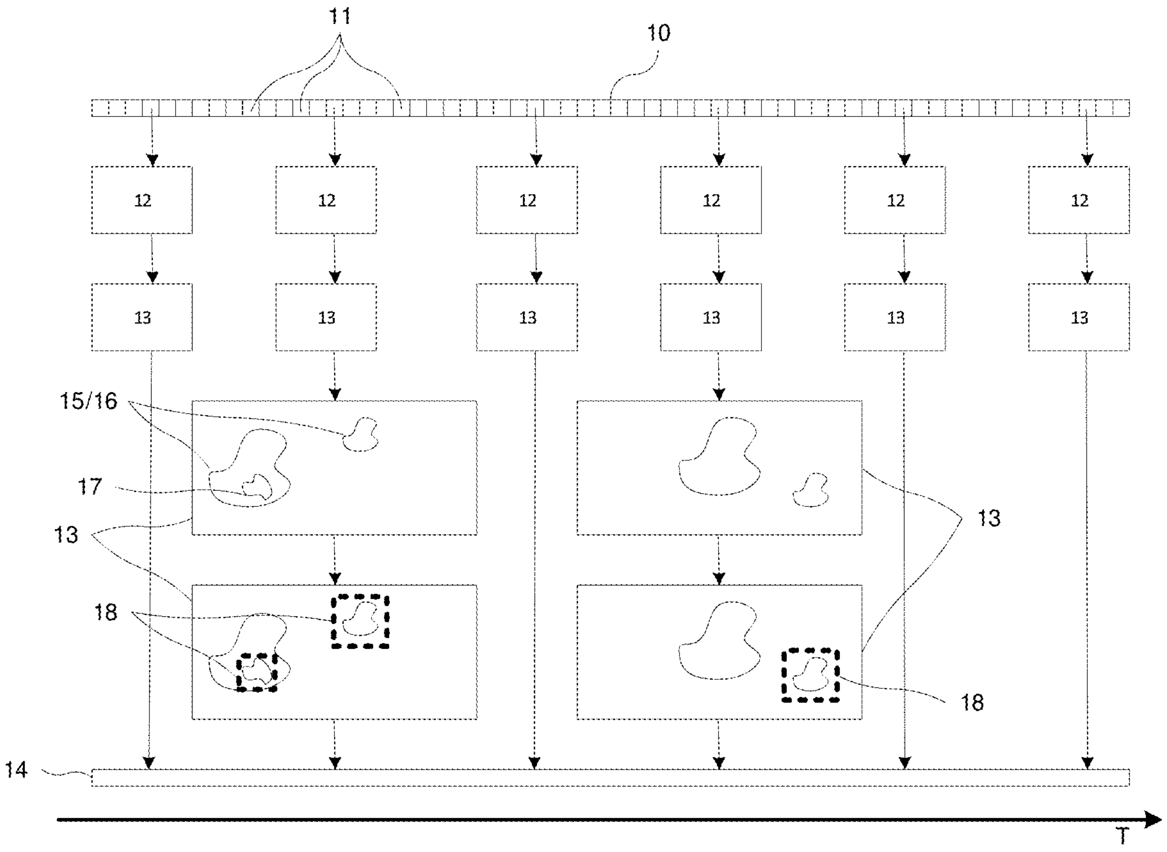
FIG. 2 illustrates conceptually the processing of a moving image in accordance with some embodiments.

FIG. 1 illustrates a system 100, configured to perform a method of the type described herein, for providing specific information regarding a moving image 10 (see FIG. 2).

As the term is used herein, a "moving image" is a digitally and electronically stored image material having a timeline. In practical examples, it can be a video, a film, an animation, or similar. Normally, such a moving image can be defined in terms of, such as stored in the form of, a sequence of individual images, where the storing of each image can be in the form of the image itself and/or a difference between consecutive images in the series of images, as the case may be and depending on things like a used compression for the storing.

The moving image can also include one or several corresponding audio information tracks, a respective timeline of which is matched to the series of images. The storing is preferably digital and electronic, whereby each image can be stored as or correspond to a respective pixmap.

Such a moving image can comprise a set of consecutive image frames along a moving image timeline. In particular, the moving image can be constituted by, or at least comprise, such a set of image frames, the image frames individually having different or identical pixel resolution, pixel depth, colour space definition, aspect ratio, fixed or variable frame rate, and so forth.

In other cases, such a moving image can be defined in terms of (as opposed to be directly constituted by) such a set of consecutive image frames. This means that it is possible to extract such set of image frames from the moving image, or to translate the moving image into such a set of images. For instance, the moving image can be stored using various encoding and compression techniques, why it may be necessary to use a particular codec or decompression algorithm to view the individual image frames given the stored moving image. Normally, the set of image frames are defined along a particular timeline, so that the image frames can be ordered one in relation to each other and pinned to particular points in time along the timeline.

The system 100 may be or comprise a central server 130. As used herein, the term "central server" is a computer-implemented functionality that is configured to be accessed in a logically centralized manner, such as via a well-defined API (Application Programming Interface). The functionality of such a central server may be implemented purely in computer software, or in a combination of software with virtual and/or physical hardware. It may be implemented on a standalone physical or virtual server computer or be distributed across several interconnected physical and/or virtual server computers.

The physical or virtual hardware that the central server 130 runs on, in other words that computer software defining the functionality of the central server 130 executes on, may comprise a per se conventional CPU, possibly a per se conventional GPU, a per se conventional RAM/ROM memory, a per se conventional computer bus, and a per se conventional external communication functionality such as an internet connection.

FIG. 1 also shows a querying device 120, such as a client. The querying device 120 can also be a central server in the above sense with the corresponding interpretation, and physical or virtual hardware that the querying device 120 runs on, in other words that computer software defining the functionality of the querying device 120 executes on, may also comprise a per se conventional CPU/GPU, a per se conventional RAM/ROM memory, a per se conventional computer bus, and a per se conventional external communication functionality such as an internet connection.

The system 100 can comprise the querying device 120, or even several such querying devices 120, and/or one or several querying devices 120 can be external to the system 100.

The system 100, such as the central server 130 or a different central server 140 of the system 100, can be configured to provide a video communication service involving two or more participating clients 121 that in turn also can be central servers in the above sense and with the corresponding interpretation. Such video communication service can be configured to allow human users 122 of the participating clients 121 to communicate with each other, digitally and automatically, using video and/or audio, via their respective participating clients 121.

Each of the one or more querying devices 120 and each of the one or more participant clients 121 can individually comprise or be in communication with a respective computer screen, configured to display video content, for instance as a part of an ongoing video communication of said type; one or several respective loudspeakers, such configured to emit sound content provided as a part of said video communication; one or several respective video cameras; and one or several respective microphones, for instance configured to record sound locally to a user 122 to said video communication, the user 122 using the participant client 121 in question to participate in said video communication.

In other words, a respective human-machine interface of each participant client 121 can be configured to allow a respective user 122 to interact with the participant client 121 in question, in a video communication, with other users and/or audio/video streams provided by various sources.

In general, each of the querying devices 120 and each of the participating clients 121 can individually comprise a respective input means 123, that may comprise said video camera(s); said microphone(s); a keyboard; a computer mouse or trackpad; and/or an API to receive a digital video stream, a digital audio stream and/or other digital data. The input means 123 can be specifically configured to receive a video stream and/or an audio stream from a central server, such as from the central server 140, such a video stream and/or audio stream being provided as a part of a video communication and possibly being produced based on corresponding digital data input streams provided to the central server 140 from at least two sources of such digital data input streams, for instance one or several of the participant clients 121 and/or from one or several external information sources.

Further generally, each of the querying devices 120 and each of the participating clients 121 can individually comprise a respective output means 124, that may comprise said computer screen; said loudspeaker(s); and an API to emit a digital video and/or audio stream, such audio stream being representative of a captured video and/or audio locally to the participant 122 using the participant client 121 in question.

In practice, each querying device 120 and each participant client 121 can individually be a mobile device, such as a mobile phone, arranged with a screen, a loudspeaker, a microphone and an internet connection, the mobile device executing computer software locally or accessing remotely executed computer software to perform the functionality of the querying device 120 or the participant client 121 in question. Correspondingly, the querying device 120 and the participant client 121 may alternatively individually be a thick or thin laptop or stationary computer, executing a locally installed application, using a remotely accessed functionality via a web browser, and so forth, as the case may be. Each querying device 120 and each participant client 121 can also individually comprise or be connected to any peripherally connected equipment, such as any external cameras, microphones and/or loudspeakers.

There may be more than one, such as at least two, at least three or even at least four, participant clients 121 used in one and the same video communication.

Each querying device 120 can individually be one and the same logical or physical unit as one of the participant clients 121. Then, the specific information about the moving image 10 queried by the querying device 120 can be used by the participant client 121 when providing the video conference experience to the corresponding user 122 or when determining information to be sent to the central server providing the video conference experience.

In some cases, the querying device 120 can be an internal part of the system 100, acting autonomously as a part of a larger information processing activity. For instance, an autonomous entity 125 in the form of an automatic "bot" type functionality can be configured to continuously or intermittently analyze an available or accruing moving image, such as a video stream, to determine a course of events or to detect a predetermined pattern therein and to perform one or several actions depending on the results of that determination or that detection. In a first example, such autonomous entity 123 can be configured to detect a person depicted in the moving image mentioning or asking with respect to a particular subject, and as a reaction thereto trigger a sequence of events providing more information about that subject. In a second example, the autonomous entity 123 can be configured to extract a course of events on a general level from the moving image and to then trigger the automatic production of a summary of the course of events represented in the moving image, for instance in the form of another moving image automatically being produced using the moving image being analyzed by the autonomous entity 123 and the results of such analysis.

As the term is used herein, "automatic production" of a moving image denotes the automatic application, by a suitably configured piece of computer software program executing on a central server of the above-described type, of a series of production decisions involving one or several input streams, such as input moving images, and resulting in one or several output streams, such as one or several output moving images. Such automatic production can be controlled on the basis of parameters and/or one or several trained neural networks.

FIG. 1 also shows a first LLM 150 and a second LLM 160. The first and second LLM: s 150, 160 can each be configured to communicate with the central server 130 by the central server 130 posing queries or requests, in the form of prompts, to each of the LLM: s 150, 160, and each of the LLM: s 150, 160 being configured to automatically respond to such prompts to the central server 130. It is realized that the LLM: s are shown in FIG. 1 to be external to the system 100, but that they can both individually alternatively be internal to the system 100. In some embodiments, the central server 130 comprises one or both of the LLM: s 150, 160.

FIG. 2 illustrates conceptually the processing of a moving image 10 in the ways described herein. T denotes a timeline of a moving image 10 of the type generally discussed above, comprising or being defined in terms of a set of consecutive image frames 11 that are extractable or translatable from the moving image 10.

Figure 3:
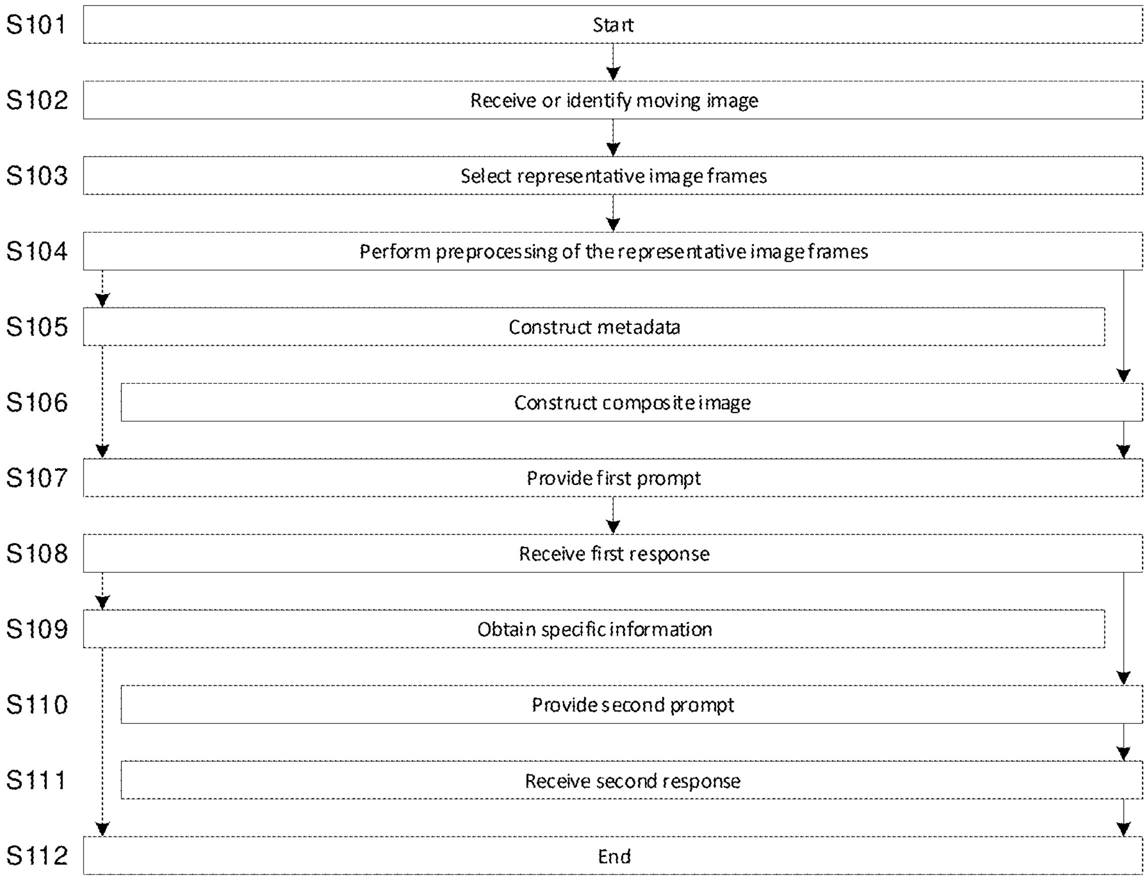
FIG. 3 is a flowchart illustrating a method in accordance with some embodiments.

FIG. 3 is a flowchart illustrating a method for performing such processing. If not stated otherwise, the central server 130 can be the entity performing the steps of the method, for instance upon request from a querying device 120. Unless stated otherwise, each step is performed automatically, digitally and electronically.

In a first step S101, the method starts.

In a subsequent step S102, the central server 130 receives or identifies the moving image 10. Alternatively, the central server 130 receives all or some of the image frames 11. As mentioned, the consecutive image frames 11 can be identified since the moving image 10 is defined in terms of them or since the consecutive image frames 11 can be extracted from the moving image 10 along the moving image timeline T. The set of consecutive image frames 11 can be a complete set of image frames 11 of the moving image 10 or a subset thereof.

In a subsequent step S103, the central server 130 selects, among the set of consecutive image frames 11, a set of discrete representative image frames 12.

The representative image frames 12 can be selected among the set of consecutive image frames 11 in various ways.

In one example, the representative image frames 12 are selected based on discrete timepoints along the moving image 10 timeline T. For instance, the representative image frames 12 can be selected at fixed or variable time intervals along the timeline T, or the representative image frames 12 can be selected at fixed or variable frame number intervals. Importantly, in some cases the representative image frames 12 can be selected without considering any image payload and/or audio payload and/or metadata contents of the moving image 10 or the consecutive image frames 11. This has proved to work sufficiently well in tests performed, and provides for improved computational resource management.

In other cases, the representative image frames 12 can be selected based on an output from an event or pattern detection algorithm, the algorithm being configured to process and analyze the consecutive image frames 11 with the purpose of detecting events or patterns therein. For instance, such an algorithm can be configured to detect scene changes, camera switches, presentation slide changes, appearing or disappearing humans or objects in the image frames 11, predetermined signs made by depicted humans, and so forth. Then, the representative image frames 12 can be selected as individual one of the set of image frames 11 that are significant of, or show, such events or patterns. For instance, in a scene change a last one of the set of consecutive image frames 11 before the scene change and a first one of the set of consecutive image frames 11 after the scene change can be both selected to form part of the representative image frames 12. In general, the detected event or pattern can constitute some discreet event or pattern and/or some transition between different states being shown in the moving image 10.

In other cases, an event or pattern detection algorithm of said type can be combined with a selection not paying attention to any payload of the image frames 11, so that for instance representative image frames 12 are selected in relation to any detected event or pattern, but during times along the timeline T when no such events or patterns are detected to trigger the selection of one or several corresponding representative image frames 12 additional representative image frames 12 can be selected at discreet points along the timeline T as described.

By selecting the set of discrete representative image frames 12 and using them instead of the entire set of consecutive image frames 11, the computational burden is decreased. It is noted that the set of discrete representative image frames 12 can be selected so as to purposefully represent or reflect some detected event or pattern or merely by selecting a certain subset of the set of consecutive image frames 11 without paying any attention to the contents of the moving image 10 or the set of consecutive image frames 11.

The selection of the set of discrete representative image frames 12 based on the set of consecutive image frames 11 can be a filter in the sense that the discrete representative image frames 12 encompass the same or fewer image frames than the set of consecutive image frames 11 for any given interval along the timeline T. Normally, the set of representative image frames 12 are fewer, such as at the most 50%, at the most 20%, at the most 10%, at the most 5% or even at the most 1% of the number of frames of the set of consecutive image frames 11. This can be true along any interval of the timeline T; along the entire moving image; or at least along parts thereof, such across at least 50% of the moving image 10 along the timeline T.

Concretely, the set of discrete representative image frames 12 can be selected as a subset of the set of consecutive image frames 11, for instance as those image frames of the set of consecutive image frames 11 that occur at predetermined time intervals along the timeline T and/or at predetermine frame intervals.

The event or pattern detection algorithm can comprise a neural network suitably trained to detect such events or patterns; and/or rule-based algorithms for such detection. Such techniques are well-known per se.

In a first example, the moving image 10 showed a teacher giving a lecture, including the display of a presentation on a screen visible in the moving image. OpenCV was then used to decode the moving image 10, and representative image frames 12 were extracted every second to capture key moments and transitions in the lecture. Also, a neural network was employed to detect presentation slide transitions in said screen.

In a second example, the moving image 10 showed a stage play involving three actors performing a dramatic scene. FFmpeg was used to decode the moving image 10, and representative image frames 12 were extracted at detected scene changes as detected by an image processing tool analyzing lighting changes in the set of consecutive image frames 11.

In a third example, the moving image 10 was security camera footage showing a bank robbery. OpenCV was used to decode the moving image 10, and representative image frames 12 were extracted every second to monitor the sequence of events during the robbery.

In a subsequent step S104, a preprocessing of the set of several discrete representative image frames 12 (and/or of the set of consecutive image frames 11, see below) can be performed by the central server 130. The preprocessing can take place using various types of digital image processing, as will be exemplified in the following, and can result in a set of discrete preprocessed image frames 13. There may be a one-to-one correspondence between each of the preprocessed image frames 13 and individual ones of the set of representative image frames 12, so that several, such as each, of the representative image frames 12 are preprocessed into a corresponding preprocessed image frame 13. This is illustrated in FIG. 2 using vertical arrows.

In some examples, the preprocessing comprises a resizing of several, such as each, of the set of discrete representative image frames 12. Here, the term "resize" is used with respect to a pixel size of the image in question. Hence, a resize of a representative image frame results in the image frame in question having a different pixmap pixel size than before the resize. The pixmap pixel size of each individual representative image frame 12 can grow, such as by using neural network-based methods for filling in details to increase pixel resolution; or it can shrink, such as by using pixel value downsampling. In some embodiments, the resize is configured to result in several, such as each, of the set of discrete preprocessed image frames 13 having the same frame pixmap pixel size; and or several, such as each, of the set of discreet preprocessed image frames 13 having a pixmap pixel size that is smaller than an original frame pixmap pixel size of the moving image 10 or of the corresponding frame in the set of consecutive image frames 11.

Similarly, the preprocessing can comprise a cropping of corresponding image frames of the set of consecutive image frames 11.

Generally, it is possible that such resizing or cropping is configured to result in that the set of preprocessed image frames 12 all have the same pixmap pixel size and pixel resolution. A uniform image frame size can be exploited to decrease the computational burden of the method. Hence, one example of a preprocessing of the set of representative image frames 12 is a pixmap transformation bringing them into conformance with each other with respect to pixmap pixel size and/or pixel resolution.

In some examples, the preprocessing comprises a normalization of several, such as each, of the set of discrete representative image frames 12, the normalization possibly being configured to result in each of the set of discrete preprocessed image frames 13 having a normalized pixel intensity distribution individually and/or across the set of preprocessed image frames 13. In other words, each of the set of representative image frames 12 individually can be normalized across a pixmap of the image frame in question and/or several, such as all, of the representative image frames 12 can be pixmap-globally normalized in relation to each other.

Examples of useful normalization algorithms include CLAHE (Contrast Limited Adaptive Histogram Equalization), Min-Max Normalization and Z-Score Normalization.

In some examples, the preprocessing comprises a denoising of several, such as each, of the set of discrete representative image frames 12, the denoising possibly resulting in each of the set of discrete preprocessed image frames 13 being denoised in relation to a corresponding representative image frame 12 in the sense that a noise level in the preprocessed image frame 13 is the same or, typically, lower as compared to the corresponding representative image frame 12. The denoising can employ any suitable digital denoising algorithm, as is per se well-known in the art.

Examples of useful denoising algorithms include edge-preserving and noise-reducing smoothing filters such as Bilateral Filtering; moving-window, non-linear digital filtering techniques such as Median Filtering; deep learning-based techniques such as a trained Deep Convolutional Neural Network; and image-globally operating techniques such as Total Variation Denoising.

In the above-described example with the lecture, the selected representative image frames were resized to 720p pixel resolution. The image frames were normalized for pixel value consistency, and a denoising filter was applied to reduce any visual noise present.

In the above example with the stage play, the image frames were resized to a consistent pixel resolution of 1080p; they were normalized to handle lighting variations and denoised to ensure clear visuals of the actors.

In the above example with the security footage, the image frames were resized to 480p pixel resolution for faster processing; they were normalized to account for different camera qualities; and a denoising was applied to enhance the clarity of the footage.

It is realized that, in each of these examples, each of the resizing, normalization and denoising was optional.

As is illustrated in FIG. 2, the preprocessing can comprise the detection of one or several image features 15 in the set of representative images 12. Each such feature may occur in a single one of the set of representative images 12 or can occur in several consecutive or disparate such images.

Alternatively, the feature 15 detection can be performed in relation to the set of consecutive image frames 11, or in relation to a combination of the set of consecutive image frames 11 and the set of representative image frames 12.

In other words, the feature 15 detection can be configured so that it can result in that one or several features 15 are identified in one or several of the set of consecutive image frames 11 and/or in one or several of the set of representative image frames 12. The feature detection can in addition or alternatively be configured so that it can result in that one or several features 15 are identified in one or several of the set of already preprocessed image frames 13.

In practical examples, the feature 15 detection can be an object 16 detection, resulting in the detection of one or several visually present objects 16 in said image frames. In similar examples, the feature 15 detection can be a detection of a human being or an animal in said image frames, resulting in the detection of one or several visually present human beings or animals It is realized that reference numeral "16" denotes an object, but that it can correspondingly denote a human being or an animal. In yet additional similar examples, the feature 15 detection can be a facial detection, resulting in the detection of one or several visually present faces in said one or several image frames, such face potentially also being denoted using reference numeral "16".

Such image detection of objects 16, human beings, animals and facial expressions is well-known as such, and can typically be conducted using a suitably trained neural network.

For feature 15 or object 16 detection, for instance, pre-trained neural network models and/or rule-based models, such as YOLO and SSD, can be used to automatically detect and classify objects. For face detection, neural network models and/or rule-based models, like MTCNN or Haar cascades, can be used to automatically detect faces.

Once one or several features 15 have been detected in the one or several image frame sets 11, 12, 13, the preprocessing step S104 can further comprise inserting visual markers 18 into one or several of the set of processed image frames 13 to highlight or otherwise mark the detected one or several features 15 in each of the one or several of the set of processed image frames 13. The visual markers 18 are applied by altering the pixel color or pixel intensity value of one or several of the individual pixels in the image frame 13, such as to a color having a high contrast in relation to surrounding pixel values in the corresponding pixmap. For instance, each of the pixels belonging to the visual marker 18 can be set to "full black" or some other high-contrast color, that may or may not be same for all pixels belonging to the visual marker 18 in question. In concrete examples, bounding squares or other geometric shapes can be used to encircle or otherwise highlight a respective detected object 16. In other concrete examples, an arrow can be used to visually point to a detected object 16 in the preprocessed image frame 13 in question. The markings 18 can in some cases be viewed as visual annotations of the preprocessed image frames 13.

In FIG. 2, some of the detected objects 16 in two of the image frames 13 have been highlighted using visual markings 19 in the form of broken bold line rectangles.

In the above-described example with the lecture, YOLO was used to detect objects like a whiteboard, markers and laptops. MTCNN was used to detect the teacher's face and draw bounding boxes around the detected objects and the detected face.

In the above example with the stage play, SSD was used to detect objects like props and furniture, and Haar cascades was used to detect the actors' faces and to draw bounding boxes around the detected objects and faces.

In the above example with the security footage, YOLO was used to detect objects like bags, guns and doors. MTCNN was used to detect the faces of robbers and customers, and to mark the detected objects and faces.

Similar techniques can be used to detect and visually mark human beings (apart from specific faces) and animals.

In some cases, a feature 15 of any of the general types discussed above is detected to occur, along the timeline T, from a particular image frame 11, 12 or 13 going forwards, and to then not occur after another, later image frame 11, 12 or 13. In general, the feature detection can be performed on several of the set of representative image frames 12 (or on several of the set of consecutive image frames 11 or preprocessed image frames 13) to detect a first image frame and/or a last image frame along the timeline T containing a detected feature 15.

In such cases, visual markings can be introduced into the corresponding first and/or last preprocessed image 13 in which the feature occurs to signify this. Alternatively, or in addition, metadata 14 (see below) corresponding or related to detected and marked 18 features 15 can be created and stored in association with the corresponding first and/or last preprocessed image frame 13.

In general, each feature 15 can be detected to have a continuous presence in a series of consecutive image frames 11, 12 and/or 13. This may encompass correlating consecutive image frames 11, 12, 13 across the timeline T to establish such continuity. Methods for such continuity surveillance are readily available, for instance for object tracking. Once a continuous presence across the timeline T has been detected, it can be visually marked 18 (for instance using the first and/or last image frame 11, 12, 13 marking discussed above) or metadata 14 can be created and stored to indicate this.

In case a feature 15 is detected in one or several particular ones of the set of consecutive image frames 11, corresponding one or several of the representative frames 12, and/or of the set of preprocessed frames 13, can be identified that also contain the detected feature 15. Then, a corresponding visual marking 18 can be inserted into the corresponding one or several preprocessed frames 13.

Once a particular feature 15 has been detected, the preprocessing step S104 can further comprise a sub-feature detection step, performed with respect of one or several of features 15 detected by the feature 15 detection, resulting in one or several detected sub-features 17 of detected features 15. For instance, in case the detected feature 15 is a human being, a sub-feature 17 can be the head or face, or other body part, of the detected human being. In case the detected feature 15 is a face, a sub-feature 17 can be a facial feature of the detected face, such as a mouth or an eye. The automatic detection of such sub-features 17 can take place using per se standard techniques of similar types as discussed in connection with feature 15 detection. For instance, a suitably trained neural network can be used.

What type of sub-features 17 to attempt detection of can be dictated by the type of feature 15 that was detected. For instance, in case a human being is detected, the method can be configured to automatically try to detect a face and a general body posture of the detected human being. Similarly, in case a face is detected, the method can be configured to try to detect the main facial features of that face. It is realized that the feature 15-sub-feature 17 correspondence can be present in several layers, such that a sub-feature 17 can have one or several lower-level sub-features 17 that can then be detected in similar ways. The feature 15 detection can be automatic in the sense that it can be more or less unsupervised. For some applications, the central server 130 can be configured to automatically look for one or several predetermined types of objects 16; whereas in other applications the search for features 15 can be fully open without any predetermined assumptions regarding what types of features 15 to look for.

In a way that is similar to the above described, visual markers 18 can be inserted into one or several of the preprocessed image frames 13 to highlight or otherwise mark the detected one or several sub-features 17. Alternatively, or in addition, corresponding metadata 14 can be constructed and stored, describing the detected sub-feature 17 in question, its properties or development along the timeline T, and so forth.

In a subsequent step S105, the set of several discrete preprocessed image frames 13 can be analyzed, using digital image and/or audio processing, to achieve the metadata 14 regarding the moving image 10. This metadata 14 can pertain to detected features 15, to detected sub-features 17 and be descriptive of what types of features 15 and/or sub-features 17 are present; how they relate to each other; how they move in the moving image across consecutive preprocessed image frames 13; and so forth. For instance, the metadata 14 can contain the information "the image frame contains a human being facing to the right in the image; it is a man; he is smiling." The metadata 14 can be plaintext of stored in a structured format such as XML. The metadata can be descriptive using textual information and/or be based on parameter values pertaining to various aspects of the features 15 and/or sub-features 17.

In the example using the lecture, the following metadata was produced in relation to a particular time along the timeline T:

```
{
  "frame_id": 47,
  "timestamp": "00:00:47",
  "person": {
    "position": "left",
    "facing": "forward",
    "emotion": "smiling",
    "action": "explaining"
  },
  "slide": {
    "title": "Introduction to Quantum Mechanics",
    "text": "Quantum mechanics is the branch of physics..."
  }
}
```

In a different example, pertaining to a moving image resulting from wildlife photography, the following metadata was produced:

```
{
  "frame_id": 250,
  "timestamp": "00:04:10",
  "animal": {
    "species": "eagle",
    "position": "top-right",
    "action": "flying",
    "direction": "left to right"
  }
}
```

As mentioned, the method can comprise detecting sub-features 17 of a particular detected feature 15. Such sub-features 17 can be visually distinct entities such as facial features. However, such sub-features 17 can also be more general properties of the detected features 15, such as related to movement through the pixmap plane of the image frames 11, 12, 13 and across the timeline T; how different detected features 15 relate geometrically and in other ways to each other; and detected states and state changes of individual features 15.

Hence, in some embodiments wherein the detected feature 15 is in relation to a human being, the method can comprise detecting also a current emotion of the human being; detecting an emotional transition of the human having across different ones of the set of processed image frames 13; detecting an identification of the human being; detecting a lip movement of the human being; detecting, using digital audio processing, a speech of the human being; detecting an action performed by the human being; detecting an interaction between the human being and another detected human being and/or a detected object 16; detecting a current pose of the human being; and/or detecting a pose change of the human being across different ones of the set of processed image frames 13. The detected feature 15 can also be an object 16, wherein the method can comprise detecting a corresponding state or state change of the object 16, as exemplified by the presentation slide change of the example with the lecture referred to above.

Again, with reference to the example with the lecture and in particular to the presentation slides, in cases where the detected feature 15 is or comprises textual information, the preprocessing step S105 can also comprise an automatically performed identification of such textual information and an automatically performed interpretation of the textual contents using optical character recognition. The textual contents can then be added to the metadata 14.

It is understood that all the above-discussed types of detections can be visual detections. However, in case the moving image 10 is associated with or contains associated audio information, the detection can incorporate an automatic, digital audio processing in addition to (such as in concert with) or alternatively to the image processing. Methods for automatic audio processing for event or pattern recognition are well-known in themselves.

Again, returning to the example with the lecture, Dlib was used to extract facial landmarks from the face of the detected teacher, and ResNet was used to extract features from detected objects like the whiteboard and laptop. OCR was used to extract the text from the presentations. The metadata 14 was populated with textual descriptions of the resulting information, using a predetermined mapping between the identified features 15 and a descriptive text and a predetermined parameter space regarding features that could be expected to be detected in the moving image.

In the example with the stage play, facial landmarks were extracted from actors' faces using Dlib, and ResNet was used to extract features from props and stage setup. Metadata 14 was populated based on the detections.

In the example with the bank robbery, facial landmarks were extracted from detected faces using Dlib, and ResNet was used to extract features from identified objects like bags and weapons. Again, metadata 14 was accordingly populated.

These sub-features 17 were automatically extracted from faces and objects for subsequent emotion and action recognition. Generally, facial landmark detection models such as Dlib were used to extract key points on faces, and sub-features 17 of detected objects 16 were automatically extracted using convolutional neural networks (CNNs) such as ResNet.

In order to determine the emotional state of detected individual human beings in each image frame 11, 12 or 13, pre-trained emotion recognition models such as AffectNet can be used to automatically detect displayed emotions, such models being able to automatically classify emotions based on detected sub-features 17 in the form of facial features. Emotional changes over time could be tracked over successive image frames 11, 12, 13 to interpret such emotional transitions.

In the example with the lecture, AffectNet was used to analyze the teacher's emotions (e.g., excitement, curiosity) in different frames, and changes in such emotions were tracked as the lecture progressed.

In the example with the stage play, the actors' emotions (e.g., sadness, anger) were automatically analyzed during key scenes using AffectNet, and again emotional transitions were automatically detected and assessed throughout the play.

In the example with the bank robbery, AffectNet was used to detect emotions like fear or stress in customers and robbers, and emotional changes were tracked as the robbery unfolded.

In order to detect who is talking in the moving image 10, lip-reading models can be utilized to correlate lip movements with speech, and audio signals of the moving image 10 can be integrated to match voices with detected faces using voice recognition models such as VGGVox.

Again, using the example with the lecture, the teacher's lip movements were analyzed to correlate them with the lecture audio. The detected voice was matched with the teacher's face using VGGVox. Metadata 14 was populated with the resulting speech.

In the example with the stage play, lip-reading models were used to detect which actor was speaking during the dialogue, and the corresponding audio was integrated to match voices with actors' faces. Metadata 14 was populated with the resulting speech, including references to currently speaking actors.

In the example with the bank robbery, lip movements of robbers and customers were analyzed to identify speakers, and audio analysis was used to match voices with detected faces during the incident. Again, metadata 14 was populated with the resulting speech together with information regarding who said what at what time in the moving image 10.

To automatically recognize actions performed by individuals in the preprocessed image frames 13, pose estimation models (e.g., OpenPose) can be applied to automatically detect body movements and postures of detected human beings. Action recognition models (e.g., 3D-CNNs) can be used to automatically classify actions based on detected pose and movement patterns.

Again, using the example with the lecture, OpenPose was used to detect the teacher's movements (writing on the board, gesturing, etc.). Actions like writing, pointing, and explaining were automatically classified using 3D-CNNs. Metadata 14 descriptive of these detections was constructed.

In the example with the stage play, actors' movements (e.g., walking, embracing) were automatically detected using OpenPose. Actions like performing, interacting, and reacting were automatically classified using 3D-CNNs. Metadata 14 descriptive of these detections was constructed.

In the example with the bank robbery, OpenPose was used to automatically detect movements (e.g., pointing a gun, raising hands), and actions like threatening, complying, and escaping were automatically classified using 3D-CNNs. Metadata 14 descriptive of these detections was constructed.

In a subsequent step S107, a first prompt can be provided to the first large language model (LLM) 150. The first prompt can be produced by the central server 130.

As used herein, a "prompt" is a piece of input information configured to be providable to, and interpretable be, an LLM so that the LLM can produce a response to the prompt. The prompt can be a textual piece of information, such as a plaintext prompt. The prompt can be, define or comprise a query.

The first prompt can comprise or reference the set of several discrete preprocessed image frames 13 produced as described above, and/or one or several pieces of processed information assembled or produced based on the set of several discrete preprocessed image frames 13. For instance, the method can comprise an additional step wherein the set of preprocessed image frames 13 are further processed or analyzed, to result in a set of one or several such pieces of processed information. Such processed information can also be or comprise external information. As a concrete example, information contained in the moving image 10, such as a depicted person referencing a certain external information source or an information source that is predetermined to be relevant for the particular context of the moving image 10 can be such processed information.

Furthermore, the first prompt can comprise or reference the metadata 14 having been constructed as generally described and exemplified above.

The piece of processed information mentioned above can comprise annotations 18 visually describing features 15 and/or actions detected in one or several of set of processed image frames 13.

The first prompt can also be configured to reference or comprise (in the case of a first prompt which is not completely textual) one or several of the moving image 10 itself; the set of consecutive image frames 11; the set of representative image frames 12; and the set of preprocessed image frames 13.

In general, the first prompt can be configured to request the first LLM 150 to provide a description of contents of the moving image 10, such as based on the information provided in the first prompt and possibly also the mentioned image material itself.

Further generally, the first prompt can be constructed so as to result, when processed by the first LLM 150, to interpret the relevant image material and to provide a coherent narrative of statuses and/or events being shown in the moving image.

In some embodiments, the first prompt is configured to refer to the combination of, firstly, the set of preprocessed image frames 13 including one or several markings 18 of the above-described type and, secondly, the metadata 14 produced in relation to detected features 15 pointed out visually by said markings 18. In other words, the first prompt comprises or refers to both the annotated preprocessed image frames 13 and to the corresponding metadata 14, and is configured to cause the first LLM 150 to provide, as a response to the first prompt, a textual description of the moving image 10.

In particular, the first prompt can be configured to cause the first LLM 150 to, as a result of the first LLM 150 processing the first prompt, analyze the metadata in connection to the corresponding image frames and to generate insights regarding what is shown in the moving image 10, such as what happened along the timeline T, including any emotional changes, actions, and/or interactions between individuals. The metadata 14 can be explicitly incorporated into the first prompt or the first prompt can be constructed based on the metadata 14, depending on a format used for the metadata 14 and the first prompt.

Generally, the first prompt can comprise explicit instructions to the first LLM 150 to convert the set of preprocessed image frames 13 into a textual representation thereof.

In the example with the lecture, the first prompt was configured to request the first LLM 150 to provide a textual description of the lecture based on the annotated preprocessed image frames 13. Metadata 14 used included, apart from textual information describing the detected features 15 and sub-features 17, the text presented in the slide presentation shown by the lecturer and visible in the moving image 10, wherein the textual contents of the slide presentation was automatically identified and interpreted using optical character recognition as a part of the preprocessing step S105. In response to this prompt, the first LLM 150 was able to generate a response containing insights on the key points of the lecture; the teacher's enthusiasm; and audience reactions.

Concretely, the first prompt was the following text:

"You are provided with a series of preprocessed image frames from a recorded lecture. These frames have been annotated with metadata that includes detected features such as the lecturer, audience reactions, and the text from the presentation slides. The metadata also includes sub-features such as the lecturer's facial expressions and actions.

Below is the metadata for a few key frames along with the extracted text from the slides:

```
{
  "frame_id": 23,
  "timestamp": "00:00:23"
  "person": {
    "position": "center",
    "facing": "right",
    "emotion": "neutral",
    "action": "writing on whiteboard"
  },
  "object": {
    "type": "whiteboard",
    "position": "left"
  }
}
{
  "frame_id": 47,
  "timestamp": "00:00:47",
  "person": {
    "position": "left",
    "facing": "forward",
    "emotion": "smiling",
    "action": "explaining"
  },
  "slide": {
    "title": "Introduction to Quantum Mechanics",
    "text": "Quantum mechanics is the branch of physics that deals with
the behavior of particles on a very small scale."
  }
}
{
  "frame_id": 78,
  "timestamp": "00:01:18",
  "person": {
    "position": "left",
    "facing": "forward",
    "emotion": "enthusiastic",
    "action": "gesturing"
  },
  "slide": {
    "title": "Wave-Particle Duality",
    "text": "Particles such as electrons exhibit both wave-like and
particle-like properties."
  }
}
```

Using the information provided in the metadata and the extracted text from the presentation slides, generate a detailed textual description of the lecture. The description should include insights on the key points discussed by the lecturer, the lecturer's enthusiasm, and notable audience reactions.

Expected Response:

The response should provide a coherent narrative of the lecture, capturing the main topics covered, the lecturer's engagement with the material, and any significant reactions from the audience. Include any additional observations about the lecturer's teaching style and the overall atmosphere of the lecture."

In the example with the stage play, the first prompt was configured to request the first LLM 150 to provide a textual description of the stage play based on the annotated preprocessed image frames 13. Metadata 14 used was, apart from textual information describing the detected features 15 and sub-features 17, stage play program information about the stage play scraped from a website describing the stage play, and the first prompt contained explicit instructions to the first LLM 150 that the actually shown stage play could be more or less according to the program information. The first prompt was configured to create a textual narrative describing the dramatic scene, including to highlight emotional exchanges, key actions, and the overall story.

In the example with the bank robbery, the first prompt included explicit instructions to pay attention to any unusual events shown in the moving image 10, and was configured to, when such an unusual event had been detected, generate a detailed text report based on the annotated image frames 13 showing the unusual event. Metadata 14 used was a description of the detected features 15. The first prompt was configured to explicitly instruct the first LLM 150 to provide, in its response, insights on the sequence of events, emotions of individuals, and actions taken.

In a subsequent step S108, a first response, to the first prompt, is received from the first LLM 150. The first response can be or comprise a textual response. The first response can comprise one or several references or links to external information and/or to specific parts of the moving image 10, such as specific times along the timeline T and/or specific parts of the corresponding pixmap in relevant ones of the set of consecutive image frames 11.

The first prompt can be configured to request the first LLM 150 to provide the first response on a particular format, such as using a structured data format such as XML following a particular schema provided in the first prompt; or JSON. In other embodiments, the first prompt can be configured to request the first LLM 150 to provide the first response on a free-text format, or even not include any specific instructions at all to this end. The first prompt can be configured to explicitly request the first LLM 150 to provide a detailed response and/or to focus on overall events and/or details; and so forth.

In the above example with the lecture, the following exemplary response (here shortened for brevity) was provided:

> "The lecture begins with the teacher writing on the whiteboard at the 00:00:23 mark. At this point, the lecturer displays a neutral expression, focusing on laying the groundwork for the lecture. Moving forward to 00:00:47, the lecturer introduces the fundamental concept of Quantum Mechanics. The slide titled "Introduction to Quantum Mechanics" explains that this branch of physics deals with the behavior of particles on a very small scale. The lecturer is smiling, which indicates his enthusiasm for the subject matter.
>
> As the lecture progresses to 00:01:18, the lecturer discusses the topic of Wave-Particle Duality. The slide presented explains that particles such as electrons exhibit both wave-like and particle-like properties. The lecturer's enthusiasm is evident as he gestures energetically, helping to engage the audience with this complex concept.
>
> Throughout the lecture, the lecturer maintains a positive and engaging demeanor. His use of smiles and gestures helps to emphasize key points and keeps the audience's attention focused on the lecture. Although the frames provided do not capture explicit audience reactions, the lecturer's expressive teaching style suggests that he is effectively engaging his students."

In a different example, still using the example with the lecture but in response to a first prompt requesting the first LLM 1150 to provide the response on a JSON format, the following response was provided (again shortened for brevity):

```
"{
  "lecture_summary": {
    "key_points": [
      {
        "timestamp": "00:00:23",
        "description": "The lecture begins with the teacher writing on the whiteboard,
displaying a neutral expression. The topic appears to be the basics of quantum
mechanics."
      },
      {
        "timestamp": "00:00:47",
        "description": "The lecturer introduces the concept of Quantum Mechanics. The
slide titled 'Introduction to Quantum Mechanics' explains that it deals with the
behavior of particles on a very small scale. The lecturer is seen smiling, indicating
enthusiasm."
      },
      {
        "timestamp": "00:01:18",
        "description": "The lecturer, showing enthusiasm and gesturing, discusses 'Wave-
Particle Duality'. The slide explains that particles such as electrons exhibit both wave-
like and particle-like properties."
      }
    ],
    "lecturer_insights": "The lecturer maintains a positive and engaging demeanor
throughout the lecture. He smiles and gestures to emphasize key points, particularly
during the explanation of complex topics like Wave-Particle Duality.",
    "audience_reactions": "There are no explicit audience reactions captured in the
frames provided."
  },
  "references": [
    {
      "timestamp": "00:00:47",
      "slide_text": "Quantum mechanics is the branch of physics that deals with the
behavior of particles on a very small scale."
    },
    {
      "timestamp": "00:01:18",
      "slide_text": "Particles such as electrons exhibit both wave-like and particle-like
properties."
    }
  ]
}"
```

In a subsequent step S109, the above-mentioned specific information regarding the moving image 10 is obtained using the first response. For example, the specific information can be obtained by querying, inspecting and/or transforming the first response.

In case the first response is provided, following the first prompt, on a predetermined data format such as XML of JSON, information about the moving image 10 can be obtained directly via inspection of the first response, such as by searching for labels of interest and interpreting the first response in connection to a found label to obtain the sought-after information.

In case the first response is provided on a free-text format, or a different non-structured format, the specific information can be obtained by free-text searching in the first response.

In either case, the first response can first be transformed, such as refactored to follow a different data syntax; cleansed; translated; and so forth, before being inspected, searched or processed to achieve the specific information.

In general, step S109 can comprise the central server 130 performing a text-based inspection or processing, such as searching or formatting, of the first response to identify the specific information in the first response, or to identify information thereafter used to construct the specific information based on the identified information.

Such transformation can be performed by an LLM, such as the first LLM 150 or a different LLM, such as the LLM 160, using a suitably configured prompt and collecting as the transformed first prompt the response from that LLM.

In some cases, in a subsequent step S110, a second prompt is provided, to an LLM that can be the first LLM 150 or the second LLM 160. The second prompt can comprise or reference the first response, and can be configured to request the LLM 150 or 160 to provide said specific information using the first response. The second prompt could have any suitable format, depending on the desired type of outcome. For instance, in case the of the example with the lecture, the second prompt may request information regarding whether or not the lecture was about 18th century art, or whether the students were engaged during the lecture. The second prompt can be configured to request the LLM 150 or 160 to provide a second response, to the second prompt, on a predetermined format, such as "yes" or "no" or a number along a predetermined scale. This way, the second response can be automatically interpreted, and the entire method can be made fully automatic.

The following is an example of the second prompt (here provided to the first LLM 150):

"Given the first response provided, we now seek specific information regarding the content and engagement level of the lecture. Please answer the following questions based on the provided summary:

1. Was the lecture about 18th-century art?
2. Did the students appear to be engaged during the lecture?

Expected Format:

Respond with "yes" or "no" for each question. For the second question, if additional details about student engagement are available, please provide them.

The following response was delivered by, and received from, the first LLM 150:

```
"{
  "answers": [
    {
      "question": "Was the lecture about 18th-century art?",
      "answer": "No"
    },
    {
      "question": "Did the students appear to be engaged during the lecture?",
      "answer": "No explicit audience reactions were captured in the frames provided.
However, the lecturer's positive and engaging demeanor suggests that the students
were likely engaged."
    }
  ]
}"
```

It is noted that the use of such second prompt makes it possible for any querying user (machine or human) to extract information on a desired detail and abstraction level, including inferred information, conclusionary information and so forth, in a way which is not possible by a more straightforward analysis of the moving image as it is.

Hence, in a subsequent step S111, the second response can be received from the LLM 150 or 160, and the second response can be used as said specific information.

In a subsequent step S112, the method ends.

Figure 4:
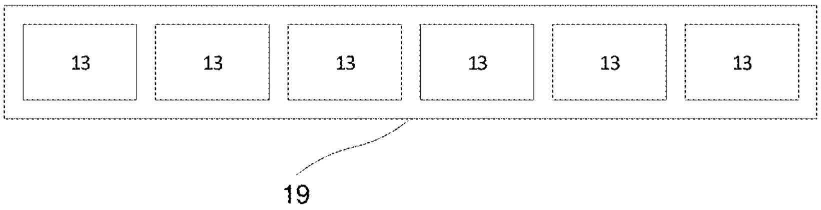
FIG. 4 illustrates a composite image in accordance with some embodiments.

The present inventors have experienced good results when the piece of processed information comprises or is constituted by a stitched together or otherwise composite image 19 comprising several, such as all, of the set of processed image frames 13 in a single, combined image 19. This is illustrated in FIG. 4. It is noted that such composite image 19 can comprise a larger number of pixels than each individual preprocessed image frame 13, but that the composite image 19 can also be downsampled in order to save on memory requirements. The individual preprocessed image frames 13 can comprise the above-described markings 18 and can generally be in the form after the preprocessing with or without said downsampling. The frames 13 can be arranged in any layout in the composite image 19, such as next to each other as in FIG. 4 or over several rows of image frames 13, for instance in a way similar to the panels of a comic book. The first prompt can be configured to inform the first LLM 150 regarding a particular way the composite image frames 13 are arranged in the composite image 19. This information can form part of the metadata 14.

The production of such a composite image 19 can be performed in a step S106.

In some cases, the composite image 19, or a sequence of such composite images 19, is the only image material contained in or referenced by the first prompt. This provides for very compact memory requirements, which is suitable for instance in cases where many first prompts are to be posed to one or several first LLM: s 150 over time.

The composite image 19 allows for the creation of a larger image or representation that encapsulates key information from the multiple preprocessed image frames 13. This is generally accomplished by combining the preprocessed image frames 13 into a single composite image 19, or into a sequence of such composite images 19, that highlights or highlight significant events in the moving image. For instance, a detected event spanning over a certain subset of the preprocessed image frames 13 can be used to form a composite image 19 illustrating the unfolding of the event as a series of discrete individual panels.

The method can furthermore comprise separately annotating 18 the composite image 19 before it is consumed by the first LLM 150, in a way that can correspond to the above-described introduction of markings 18 based on detected features 15 and/or sub-features 17. Hence, overlay bounding boxes and detected annotating information (e.g., emotions, actions, speakers) can be introduced into the composite image for visualization. Such annotations 18 in the composite image 19 can be in addition to any annotations 18 introduced into each individual preprocessed image 13 and/or any or all annotations 18 can be introduced only into the composite image 19. In case annotations 18 are introduced additionally into the composite image 19, such annotations 18 can relate to events spanning across several consecutive preprocessed image frames 13, such as interconnecting, for instance using a high-contrast line or arc, a corresponding detected object 16 that is moving across the pixmap between different preprocessed image frames 13 along the timeline T.

In the example with the lecture, identified key preprocessed image frames 13 were stitched together to create a composite image 19 illustrating the lecture's progression. Each different slide in the presentation showed by the teacher was represented by at least one corresponding preprocessed image frame 13 in the stitched-together composite image 19, this selection being a result of the selection of the set of representative image frames 12 being performed based on an image processing configured to determine a switch in such presentation slide. The composite image 19 was annotated using bounding overlay boxes around the teacher, whiteboard, and detected emotions before being referenced in the first prompt to the first LLM 150.

In the example with the stage play, the preprocessed image frames 13 were combined into a composite image 19 to show the sequence of the dramatic scene. Bounding boxes were introduced around detected actors, emotions and key actions.

In the example with the bank robbery, a composite image 19 was created showing the sequence of the robbery, and annotations were added in the form of bounding boxes 15 around robbers, customers, and detected actions.

Each of the modules 120, 121, 130, 140 can be implemented in software, hardware or a combination of the two. The system 100 can correspondingly be implemented in software, hardware or a combination of the two. The system 100 can be implemented as one single piece of physical or virtual hardware, such as in the form of a computer program stored and executed locally on a computer server. The system 100 can alternatively be implemented in a distributed fashion, with different logical parts implemented in software stored and executing on several collaborating physical or virtual pieces of hardware. The functionality described herein of each of the modules 120, 121, 130, 140 can be implemented as separate 25 or joint logical pieces of functionality.

All functionality described herein can be implemented using corresponding software, hardware or a combination of the two. Any software is configured to be stored and executed on corresponding general-purpose hardware. Functionality-specific hardware and/or general-purpose hardware can comprise at least one CPU or other processing unit; at least one digital memory, such as RAM memory; at least one computer bus or similar internal computer communication facility; peripheral communication facilities such as an internet interface, a computer mouse, a keyboard, a computer screen, and so forth.

Unless otherwise stated, all functionality described herein can be performed automatically.

Above, preferred embodiments have been described. However, it is apparent to the skilled person that many modifications can be made to the disclosed embodiments without departing from the basic idea of the invention.

For instance, the specific information can be determined in real-time or near real-time, by the steps S102-S111 being performed repeatedly using updated information regarding a continuously captured moving image 10. For instance, the bot functionality 125, or module 140, can be arranged to continuously monitor one or several video streams accruing as a part of an ongoing video communication service provided by module 140, and to use the specific information as a basis for automatic video stream production decisions applied to said video streams; alerting; automatically providing additional information to a user 122 of the device 121; providing automatically produced summaries of information disclosed in said video streams; and so forth.

In other cases, the steps S102-S111 are performed not in real-time but based on a certain moving image 10 to be analyzed. For instance, an automatic summary of a moving image can be provided to a user 122 of what has happened before in the context of a video communication service of said type, for the user 122 to be able to catch up.

In general, everything that has been said about the system is correspondingly applicable to the method and the computer program product and vice versa.

Hence, the invention is not limited to the described embodiments, but can be varied within the scope of the enclosed claims.

The invention claimed is:

1. A method for providing specific information regarding a moving image, comprising: receiving the moving image, the moving image comprising or being defined in terms of a set of consecutive image frames along a moving image timeline and/or the set of consecutive image frames being extracted from the moving image along the moving image timeline; selecting a set of discrete representative image frames, the representative image frames being selected among the set of consecutive image frames based on at least one of discrete points along the moving image timeline and an event detection algorithm; detecting a feature identified in several of the set of consecutive image frames and/or in several of the set of representative image frames; preprocessing, using digital image processing, the set of several discrete representative image frames to achieve a set of discrete preprocessed image frames; analyzing, using digital image and/or audio processing, the set of several discrete preprocessed image frames to achieve metadata regarding the moving image, the metadata describing the feature, providing a first prompt to a first large language model (LLM), the first prompt comprising or referencing the set of several discrete preprocessed image frames or a piece of processed information assembled based on the set of several discrete preprocessed image frames, the first prompt comprising or referencing the metadata, the first prompt being configured to request the first LLM to provide a description of contents of the moving image; receiving a first response from the first LLM; and using the first response to provide the specific information by querying, inspection or transformation of the first response.

2. The method of claim 1, further comprising:

providing a second prompt to a second LLM, that can be the same as the first LLM, the second prompt comprising or referencing the first response and being configured to request the second LLM to provide the specific information using the first response;

receiving a second response from the second LLM; and using the second response as the specific information.

3. The method of claim 1, wherein:

the first prompt is configured to request the first LLM to provide the first response on a predetermined format.

4. The method of claim 3, wherein the method further comprises:

performing a text-based inspection or processing, such as searching or formatting, of the first response to identify the specific information in the first response.

5. The method of claim 1, wherein:

the set of discrete representative image frames constitute less than 10% of the number of image frames in the set of the set of consecutive image frames.

6. The method of claim 1, wherein:

the set of discrete representative image frames are selected as a subset of the set of consecutive image frames that occur at predetermined time intervals and/or at predetermine frame intervals.

7. The method of claim 1, wherein the preprocessing comprises one or several of:

a resizing of each of the set of discrete representative image frames, resulting in each of the set of discrete preprocessed image frames having the same frame pixel size, the same frame pixel size being smaller than an original frame pixel size of the moving image;

a normalization of each of the set of discrete representative image frames, resulting in each of the set of discrete preprocessed image frames having a normalized pixel intensity distribution individually and/or across the set of preprocessed image frames; and a denoising of each of the set of discrete representative image frames, resulting in each of the set of discrete preprocessed image frames being denoised.

8. The method of claim 1, wherein:

the preprocessing comprises a feature detection, resulting in that one or several features are identified in one or several of the set of consecutive image frames or in one or several of the set of representative image frames or in one or several of the set of preprocessed image frames, and the preprocessing further comprises inserting visual markers into one or several of the set of processed image frames to highlight or otherwise mark the detected one or several features in each of the one or several of the set of processed image frames.

9. The method of claim 8, wherein the feature detection is one or several of:

an object detection, resulting in the detection of one or several visually present objects;

a human being detection, resulting in the detection of one or several visually present human beings; and a facial detection, resulting in the detection of one or several visually present faces.

10. The method of claim 8, wherein:

the feature detection is performed on several of the set of consecutive image frames to detect a first frame and/or a last frame containing a detected feature, and the method further comprises identifying corresponding ones of the set of representative frames or of the set of preprocessed frames that contain the detect the detected feature.

11. The method of claim 8, further comprising:

a sub-feature detection step, performed with respect of one or several of features detected by the feature detection, resulting in one or several detected sub-features of detected features.

12. The method of claim 11, wherein the preprocessing further comprises:

describing the one or several detected sub-features using the metadata.

13. The method of claim 11, wherein the preprocessing further comprises:

inserting visual markers into one or several of the set of processed image frames to highlight or otherwise mark the detected one or several sub-features in each of the one or several of the set of processed image frames.

14. The method of claim 13, wherein:

the one or several sub-features comprise one or several facial features of one or several faces.

15. The method of claim 8 wherein the feature detected in the feature detection step is in relation to a human being, and wherein the method further comprises one or several of:

detecting an emotion of the human being;

detecting an emotional transition of the human having across different ones of the set of processed image frames;

detecting an identification of the human being;

detecting a lip movement of the human being;

detecting, using digital audio processing, a speech of the human being;

detecting an action performed by the human being;

detecting an interaction between the human being and another detected human being and/or a detected object;

detecting a pose of the human being; and detecting a pose change of the human being across different ones of the set of processed image frames.

16. The method of claim 1, wherein:

the piece of processed information comprises a stitched together image comprising several of the set of processed image frames in a single, combined image.

17. The method of claim 1, wherein:

the piece of processed information comprises annotations visually describing features and/or actions detected in one or several of set of processed image frames.

18. The method of claim 1, wherein:

the first prompt comprises instructions to the first LLM to convert the set of preprocessed image frames into a textual representation thereof.

19. A system for providing specific information regarding a moving image, the system being configured to: receive the moving image, the moving image comprising or being defined in terms of a set of consecutive image frames along a moving image timeline and/or the set of consecutive image frames being extracted from the moving image along the moving image timeline; select a set of discrete representative image frames, the representative image frames being selected among the set of consecutive image frames based on at least one of discrete points along the moving image timeline and an event detection algorithm; detecting a feature identified in several of the set of consecutive image frames and/or in several of the set of representative image frames; preprocess, using digital image processing, the set of several discrete representative image frames to achieve a set of discrete preprocessed image frames; analyze, using digital image and/or audio processing, the set of several discrete preprocessed image frames to achieve metadata regarding the moving image, the metadata describing the feature, provide a first prompt to a first large language model (LLM), the first prompt comprising or referencing the set of several discrete preprocessed image frames or a piece of processed information assembled based on the set of several discrete preprocessed image frames, the first prompt comprising or referencing the metadata, the first prompt being configured to request the first LLM to provide a description of contents of the moving image; receive a first response from the first LLM; and use the first response to provide the specific information by querying, inspection or transformation of the first response.

20. A computer program product for providing specific information regarding a moving image, the computer program product being stored on a non-transitory computer-readable medium and being configured to, when executing on one or several processors: receive the moving image, the moving image comprising or being defined in terms of a set of consecutive image frames along a moving image timeline and/or the set of consecutive image frames being extracted from the moving image along the moving image timeline; select a set of discrete representative image frames, the representative image frames being selected among the set of consecutive image frames based on at least one of discrete points along the moving image timeline and an event detection algorithm; detecting a feature identified in several of the set of consecutive image frames and/or in several of the set of representative image frames; preprocess, using digital image processing, the set of several discrete representative image frames to achieve a set of discrete preprocessed image frames; analyze, using digital image and/or audio processing, the set of several discrete preprocessed image frames to achieve metadata regarding the moving image, the metadata describing the feature, provide a first prompt to a first large language model (LLM), the first prompt comprising or referencing the set of several discrete preprocessed image frames or a piece of processed information assembled based on the set of several discrete preprocessed image frames, the first prompt comprising or referencing the metadata, the first prompt being configured to request the first LLM to provide a description of contents of the moving image; receive a first response from the first LLM; and use the first response to provide the specific information by querying, inspection or transformation of the first response.

* * * * *